(12) United States Patent
Winther

(10) Patent No.: US 7,790,973 B1
(45) Date of Patent: Sep. 7, 2010

(54) EASY-KEYS

(76) Inventor: Paul James Winther, 511 Ridge Dr., Nampa, ID (US) 83686-8717

( * ) Notice: Subject to any disclaimer, the term of this patent is extended or adjusted under 35 U.S.C. 154(b) by 0 days.

(21) Appl. No.: 12/004,650

(22) Filed: Dec. 21, 2007

Related U.S. Application Data

(60) Provisional application No. 60/886,885, filed on Jan. 26, 2007.

(51) Int. Cl.
*G09B 15/08* (2006.01)
(52) U.S. Cl. .................................. 84/478; 84/470 R
(58) Field of Classification Search ............ 84/478, 84/470 R, 471 R, 472, 477 R; D19/62
See application file for complete search history.

(56) References Cited

U.S. PATENT DOCUMENTS

| | | | | |
|---|---|---|---|---|
| 2,188,098 A | * | 1/1940 | Bostelmann, Jr. | 84/479 R |
| 2,360,534 A | * | 10/1944 | Allen | 84/483.1 |
| 3,280,687 A | * | 10/1966 | Ericksen | 84/480 |
| 3,339,447 A | | 9/1967 | Curry | |
| 3,350,973 A | * | 11/1967 | Weis et al. | 84/478 |
| 3,395,600 A | * | 8/1968 | Leonard | 84/478 |

* cited by examiner

*Primary Examiner*—Jianchun Qin

(57) ABSTRACT

Easy-Keys, a template of thirteen slots spaced as an one octave chromatic scale, with eight moveable fingers, to be placed on a piano-like keyboard. Easy-Keys shows the forms or tonal patterns of music and the application of the rules relating to the circle of keys and chords. Designed as a standalone product or to be used as a page or insert in books, publications or games. One page, which is comprised of the supporting body and eight fingers. Remove Easy-Keys from the page on the scored lines and assemble by folding on the stamped lines. The supporting body is one piece with interlocking folds. The fingers have stamped folds, and will snub or lock in any position once inserted into place as a part of the supporting body. This feature makes possible its use behind the keys as a guide when playing.

3 Claims, 4 Drawing Sheets

EASY-KEYS

CROSS-REFERENCE TO RELATED APPLICATIONS

This application claims the benefit of provisional patent application Ser. No. 60/886,885 filed 2007 Jan. 26 by the present inventor, which is incorporated by reference.

FEDERALLY SPONSORED RESEARCH

Not Applicable

SEQUENCE LISTING OR PROGRAM

Not Applicable

BACKGROUND

1. Field of Invention

Easy-Keys, a hands-on instructional tool showing musical forms upon which music theory is based. Easy-Keys acts as a unifying resource by showing the many elements of music patterns as complete forms, when placed on a piano-like keyboard.

2. Prior Art

Previously the embodiment of U.S. Pat. No. 3,339,447 1967 Sep. 5, by Curry was designed to use wood, plastic or the like, thus making its use as a page or insert in a book impossible. The unit was designed to be placed on the keyboard to show scales or chords and then removed so the student could proceed. In this model the student was unable to use the unit behind the keys as a guide. Once removed from the keyboard the unit does not retain its form, showing sharps and flats. These problems have been eliminated by using paper products that are laminated. Resulting in an improved design.

SUMMARY

Easy-Keys is a visual extension of music, which is an orderly arrangement of tones in patterns and rhythms. Easy-Keys shows the tones in patterns as an octave of the selected intervals, a demonstration of form by example.

DRAWINGS

Figures

In the drawings the figures are numbered 1-7, the parts are numbered the same in each.

DETAILED DESCRIPTION

Figure 1:
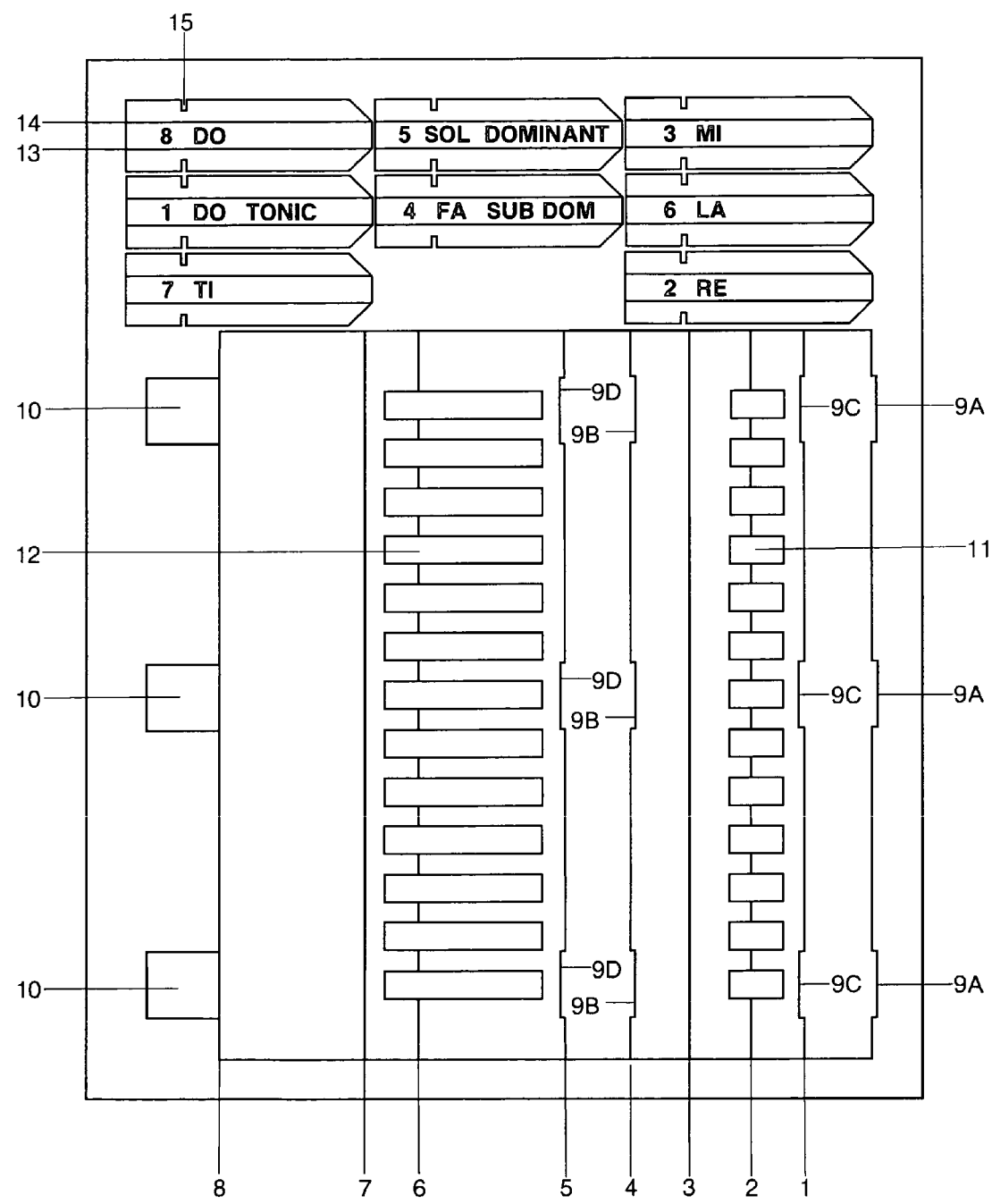
FIG. 1 shows a printed page, scored and stamped for all parts necessary for assembly.
Figure 2:
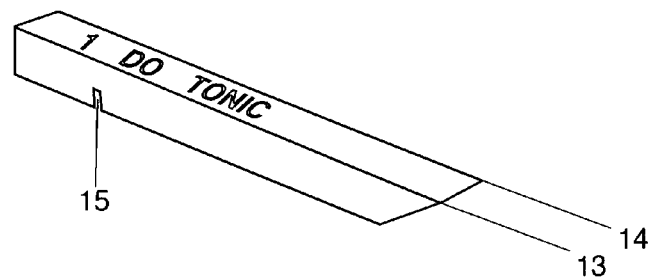
FIG. 2 shows finger no. 1 of the eight, folded and ready to insert into the assembled body.
Figure 3:
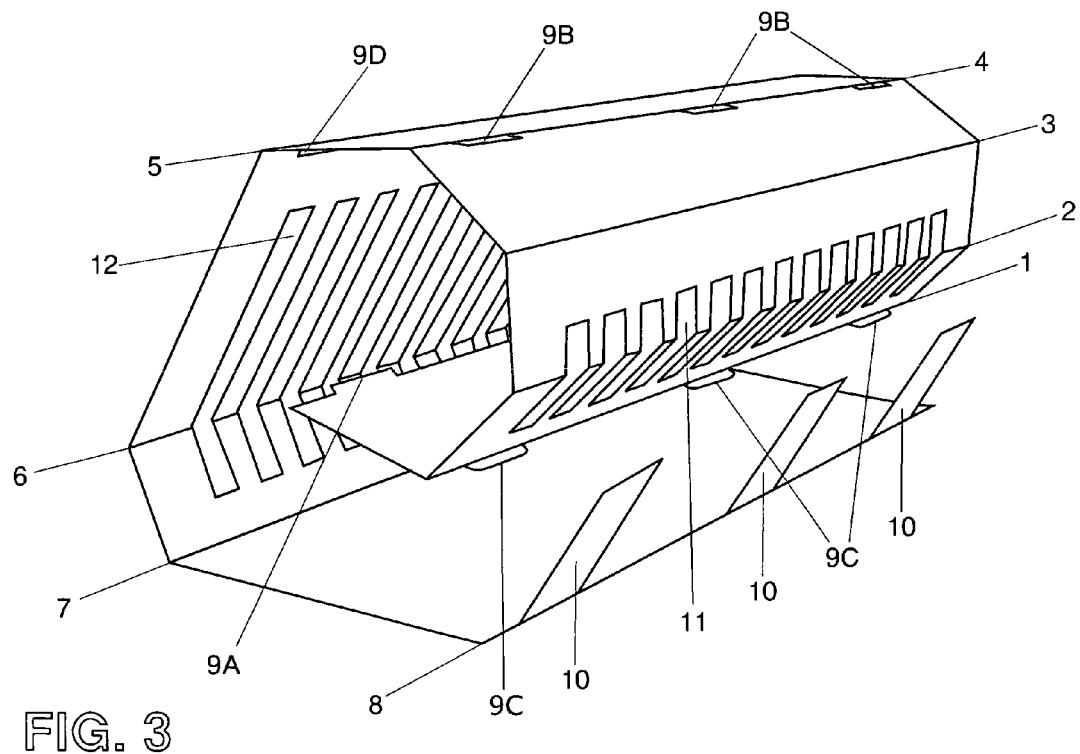
FIG. 3 shows the main body in the process of the eight folds.
Figure 5:
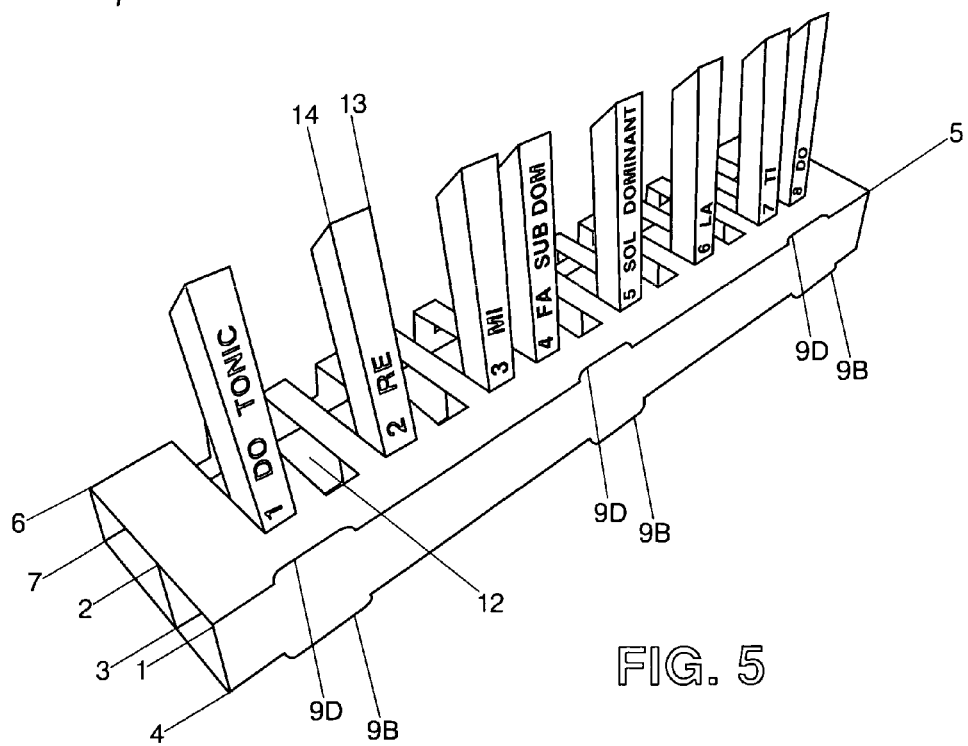
FIG. 5 shows the main body with 8 fingers inserted on end, demonstrating a major scale.
Figure 6:
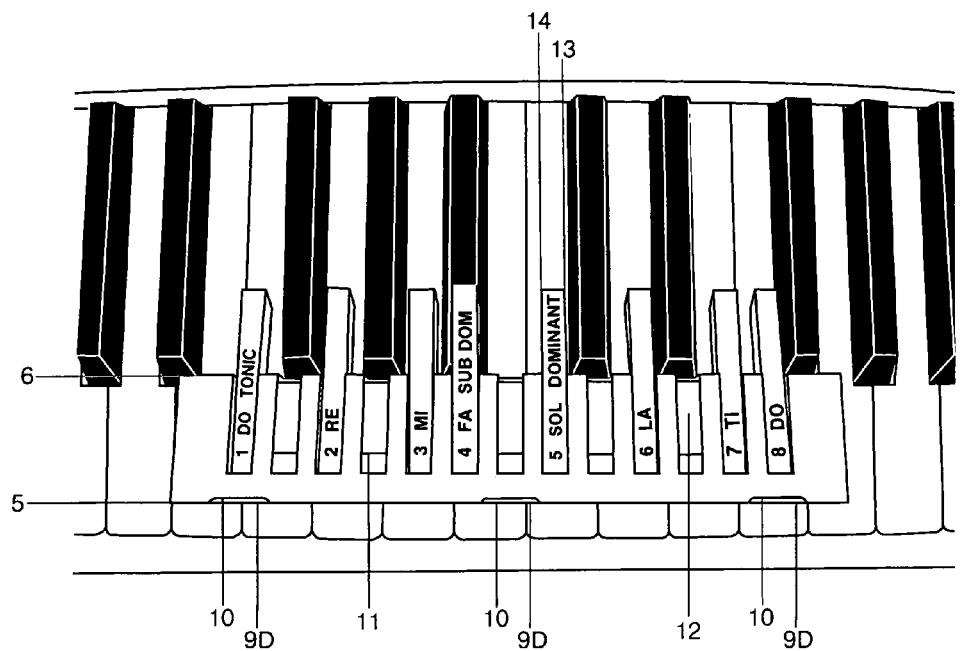
FIG. 6 shows Easy-Keys on a keyboard to show the F scale.
Figure 7:
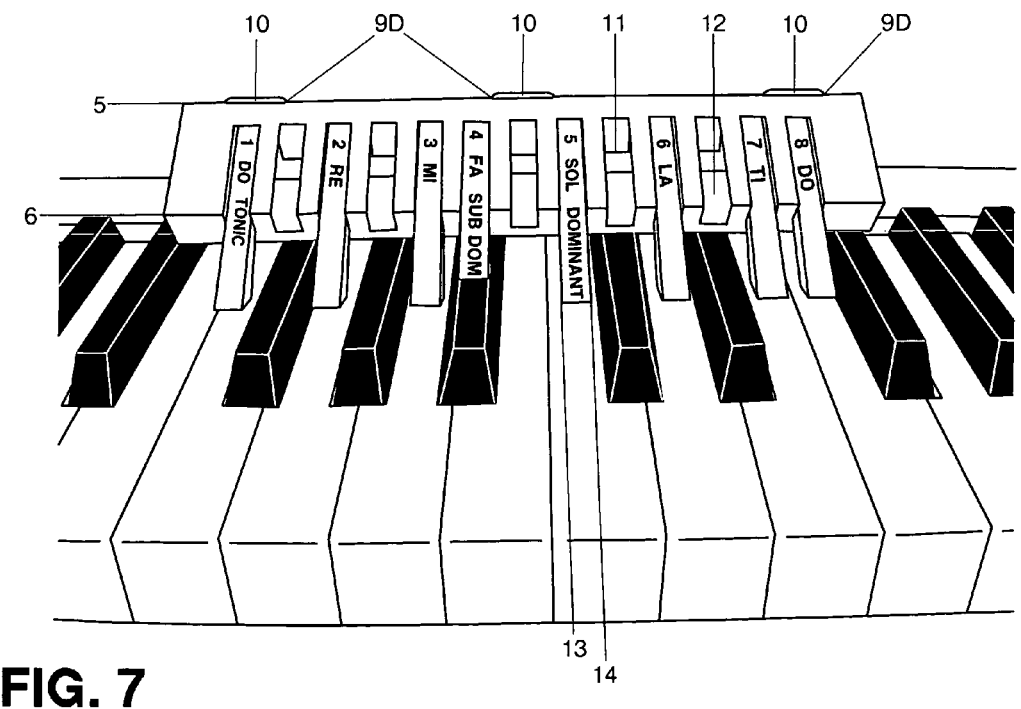
FIG. 7 shows Easy-Keys on a keyboard to guide, playing the F scale.

Easy-Keys assembled FIG. 5 or unassembled FIG. 1 uses a printed paper page, laminated, scored and stamped. Remove the main body of Easy-Keys from the page by separating the scored edges from the page. Remove 13 small rectangular punch-outs FIG. 1, no. 11. The bottom edge is the fulcrum for the placement of the fingers. Remove 13 large rectangular punch-outs no. 12; the parallel edges are guides where the fingers are placed. Position the page with the printed side up on a table and use the edge to fold down the lines 1-8 that are stamped, starting with no. 1, FIG. 3.

Figure 4:
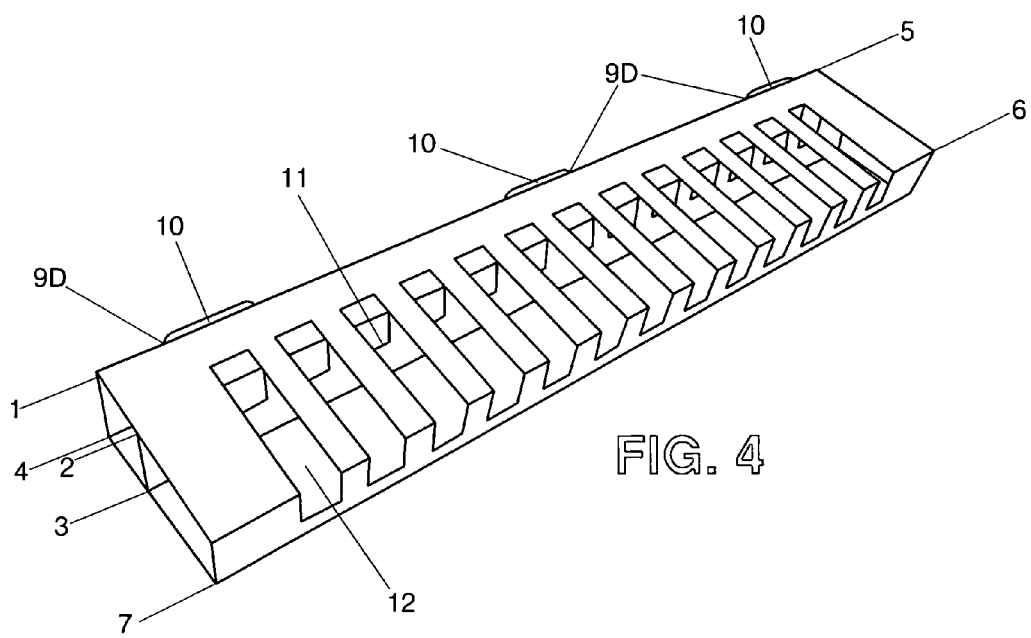
FIG. 4 shows the main body complete after folding.

Compress the folds 1-5 and engage the six tabs FIG. 1 9A and 9C, forming a box with 90° corners, FIG. 4. Compress lines 6 and 7 bringing the three tabs under the box and insert them on the inside of the B slot and push up through the D slot, thus completing the inter-locking of all pieces. Remove the eight fingers from the printed page and fold down each finger on the two stamped lines no's 13 and 14, compress the folds. Start from the left side FIG. 5, and place the fingers in numerical order, on end, at the back of the fulcrum. When the fingers are placed in the proper slots for the form you wish, lower the fingers, making sure the fulcrum is engaged by the slots FIG. 1, no. 15.

CONCLUSION, RAMIFICATIONS AND SCOPE

Teaching from printed music and words the relationship of tonal patterns to intervals is time consuming, repetitive and often unsuccessful. This is the foundation for creating music which needs a mind that can visualize. Everyone cannot comprehend abstract technical discussions. Easy-Keys shows the examples of these relationships visually by forms of the patterns making it easier to understand because you prove the laws and rules are related. The visual solution is a template, the silent helper by demonstration and example.

I claim:

1. A musical scale teaching device for locating intervals for a scale on a piano like keyboard, comprising of a printed page, laminated, die cut, scored, stamped, folded into an elongated supporting template to be placed on a keyboard, transverse to the white keys thereof, whereas the body of the template is formed with evenly spaced transverse grooves corresponding in number to the number of semitones in an octave and fingers for the intervals are arranged in the grooves in accordance to the scale interval arrangement, so the device is then placed on the keyboard to show by visual indication the proper scale, wherein the device is then removed, or the finger positions are reversed for placement behind the keyboard to guide while playing.

2. A musical scale teaching device according to claim 1, wherein it is a device for measuring intervals of the semitones in an octave to clearly see and understand the musical concepts of scales, modes, chords, reading in keys and transposition on a keyboard, placed to show or guide in all keys and show the relationship visually to rules and music notation used in the beginning of music instruction, designed to use as a page or insert in books of music instruction or as a stand alone visual primer.

3. A musical scale teaching device according to claim 1, wherein the fingers are indicators of intervals and labeled with notation to indicate the interval they represent by numbers 1 through 8 for writing in any key, by solmization, the use of syllables to vocalise the scale, a color for fingers of the key note, dominant and sub-dominant intervals, a color for the minor intervals.

* * * * *